United States Patent [19]

Huang

[11] Patent Number: 5,074,002

[45] Date of Patent: Dec. 24, 1991

[54] COLLAPSIBLE HAND SAW

[75] Inventor: Alan Huang, Taichung Hsien, Taiwan

[73] Assignee: Hack Saw & Knife Manufactory Co., Ltd., Taichung Hsien, Taiwan

[21] Appl. No.: 705,438

[22] Filed: May 24, 1991

[51] Int. Cl.⁵ .............................................. B25F 1/00
[52] U.S. Cl. ....................................... 7/149; 30/512; 30/517
[58] Field of Search ................... 7/149, 144; 30/512, 30/513, 517, 520, 525

[56] References Cited

U.S. PATENT DOCUMENTS 1,194,234  8/1916  Remington ............................ 30/250
3,038,177  6/1962  Malhtle ................................ 7/149 X
4,256,156  3/1981  Biszantz et al. ................... 30/513 X
4,466,471  8/1984  Thomson ............................. 30/517

Primary Examiner—Douglas D. Watts
Attorney, Agent, or Firm—Browdy and Neimark

[57] ABSTRACT

A collapsible hand saw has a head portion which has a first receptacle to detachably connect with one end of a frame portion, and a handle portion to fixedly connect with the other end of the frame portion, so as to form a bow shape had saw framework to detachably connect a blade. The head portion has an integrally formed hammer member and a V-shaped notch to substantially drive and pull a nail. In addition, a plurality of spare blades can be mounted with the frame portion between the head portion and the handle portion.

4 Claims, 3 Drawing Sheets

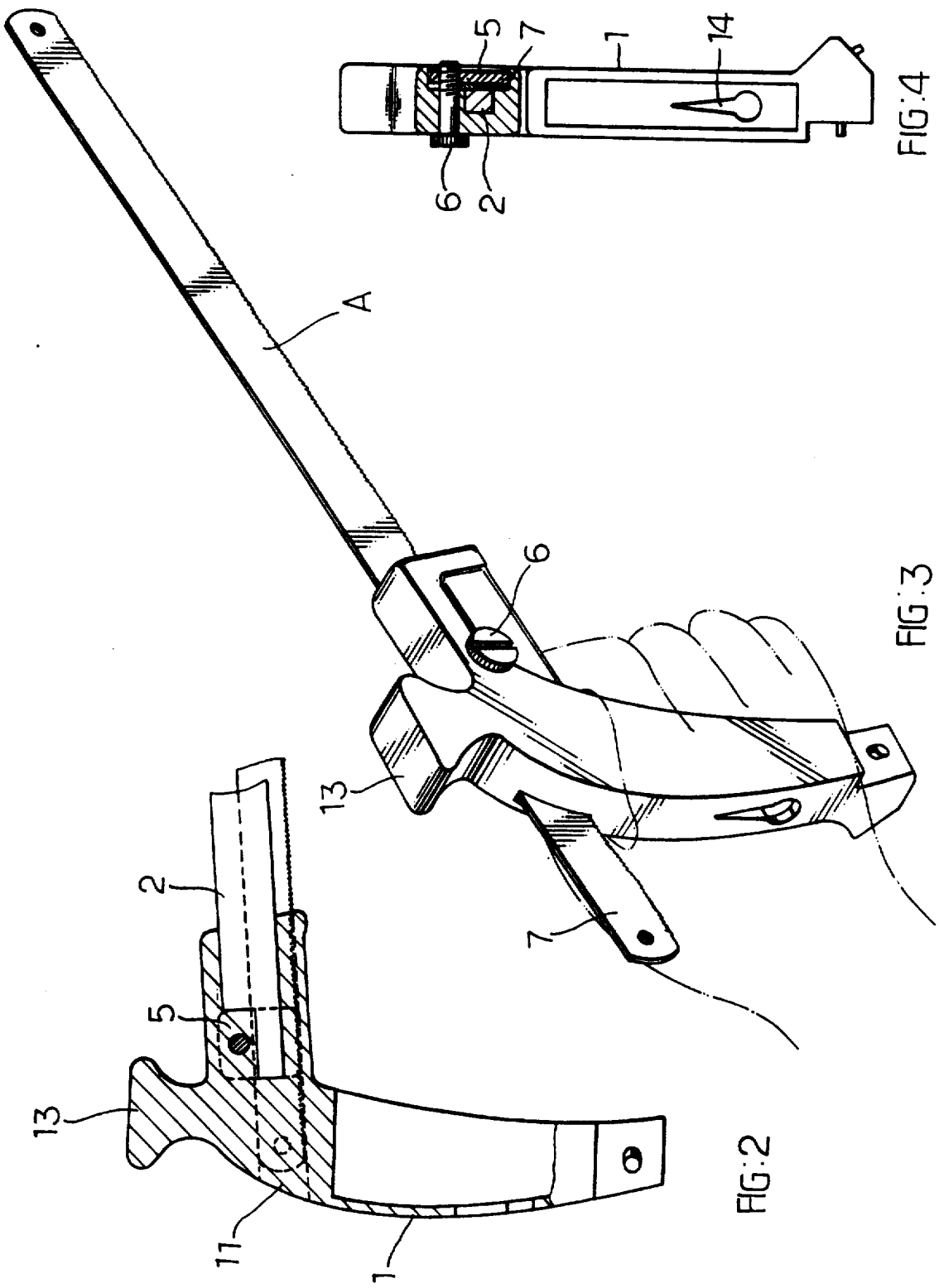

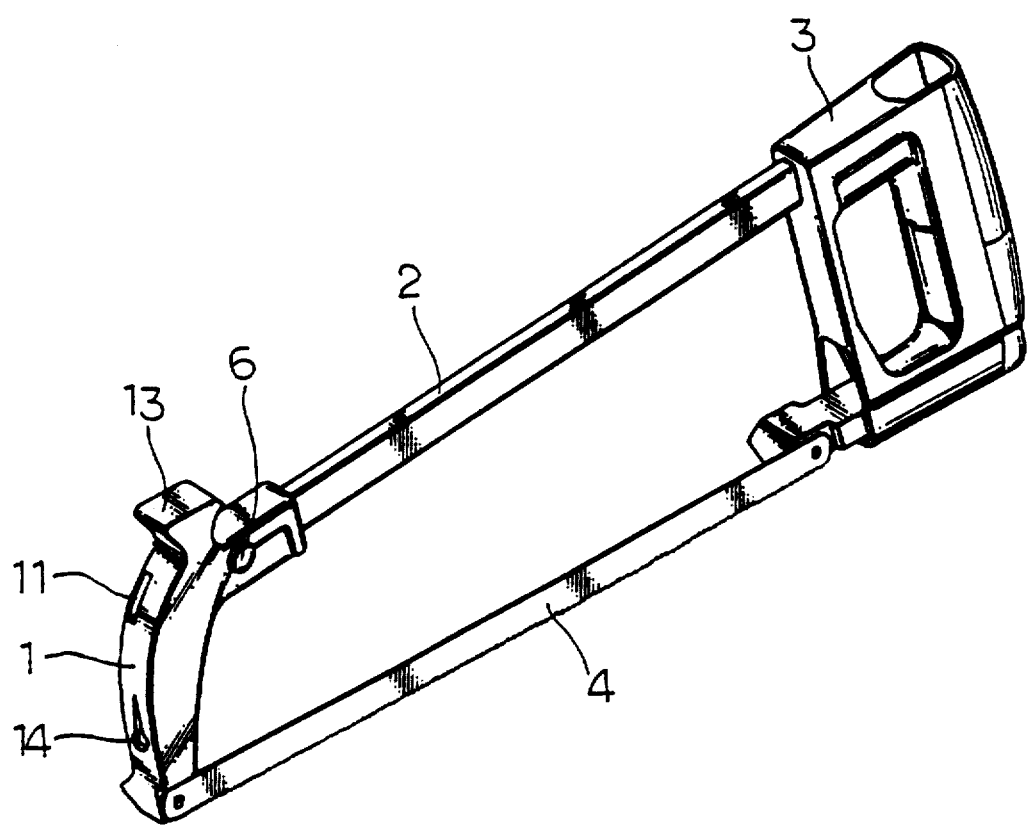
FIG:5

COLLAPSIBLE HAND SAW

BACKGROUND OF THE INVENTION

The present invention is related to hand saw, particularly to the type having collapsible handle and frame portion with a hammer and notch to pull out a nail.

While it is conventionally used a hand saw, which is considered pertinent to the present invention, has a integrally formed bow-shaped framework to threadedly engage with a blade. It has been also proposed a hammer having a claw portion to pull out nails. However, it is advantageous to combine there two functions together when the weight is of main concerns.

It is also observed that the conventional type of hand saw can not carry spare blade by itself. This is vital since the duration of blade is unpredictable. And conventionally, when a blade is broken in half or pieces, it becomes useless. However, it is or great interest to utilizes the broken piece, so as to decrease expenses in some extent.

SUMMARY OF THE INVENTION

The present invention utilizes a collapsible frame structure, within which a plurality of spare blades are disposed. A head portion is formed to a hammer shape provided with a notch for pulling out nail, while the handle is formed suitably for holding in reverse direction to facilitate the driving and pulling nails.

Therefore, it is an object of the present invention to resolve the problems found in conventional types.

It is also an object of the present invention to provide a hand saw which is suitable for both driving and pulling nails.

Other advantages and objectives will be appreciated as the invention becomes better understood by reference to the following description when considered in connection with the accompanying drawings.

BRIEF DESCRIPTION OF THE DRAWINGS

FIG. 2 shows partial section view of handle portion;

FIG. 3 shows another embodiment according to the present invention;

FIG. 4 is a frontal elevational view showing the head portion thereof;

FIG. 5 is a perspective view showing the present invention in assembly.

DETAILED DESCRIPTION OF THE PREFERRED EMBODIMENT

Figure 1:
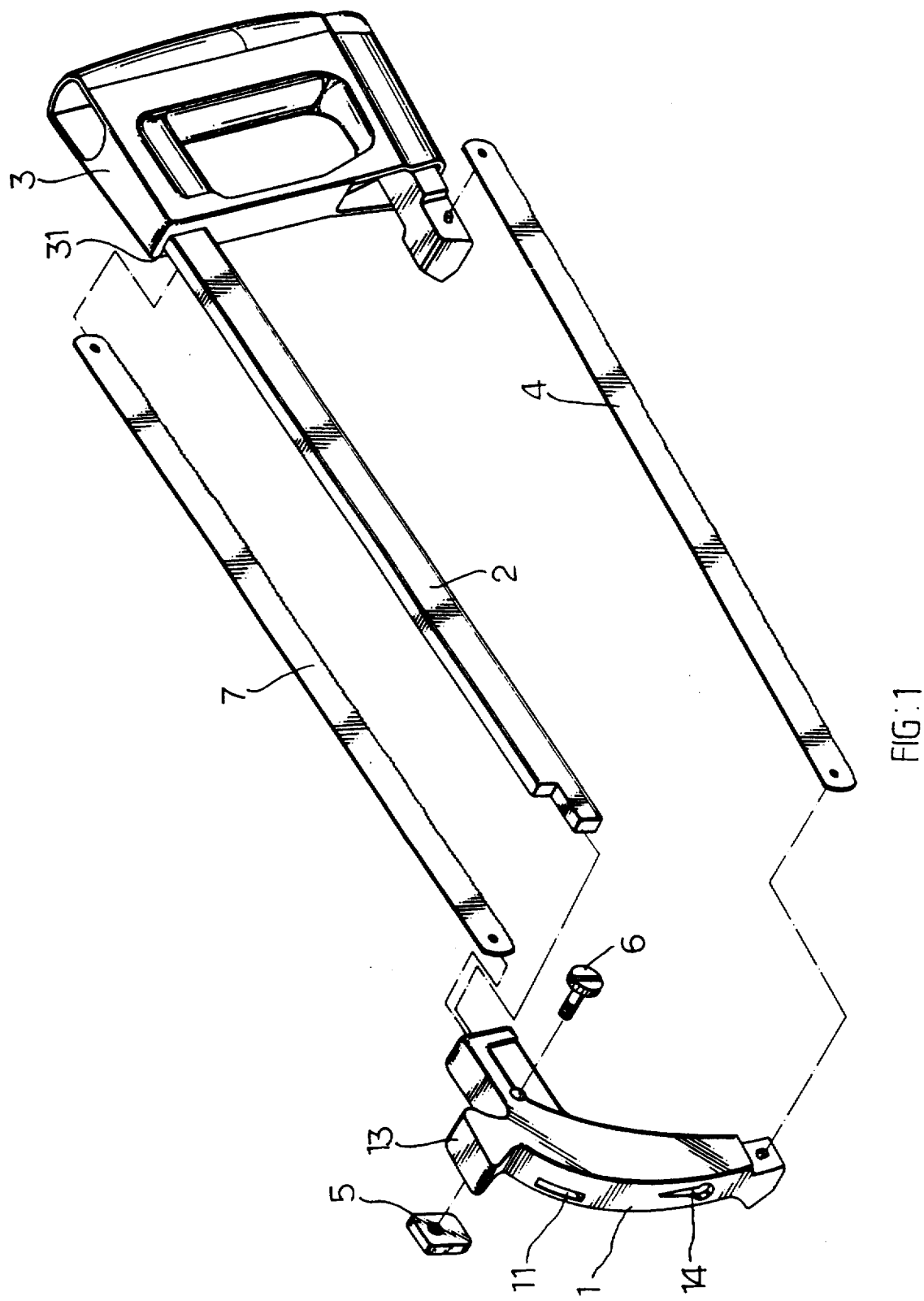
FIG. 1 is a perspective explored view showing an embodiment according to the present invention.

With reference to FIGS. 1 and 2, a collapsible hand saw generally has a head portion 1, a frame portion 2, a handle portion 3 and a blade 4.

The head portion 3 has a first opening 11 in cooperated with a second opening 31 defined on the handle portion 3 to interpose the frame member 3, while a recess 12 laterally formed on the head portion to receive spare blades 7.

Covered on the recess is a block member 6, on which a screw 6 is mounted. Therefore, the spare blades and the frame member can be secured.

A V-shaped notch 14, which is best shown in FIGS. 1 and 4, is defined on the front of the head portion to pull out the nail (not shown). The head portion also has a hammer member 13 from integrally thereon, so as to drive a nail.

Further referring to FIGS. 3 and 4, the head portion 1 can be used separately. The spare blade 7 or a broken blade can be snapped in the first opening 11 and secured by the block 5 via screw 6. This is advantageous when the working space is confined or when cutting a groove or slot is desired.

FIG. 5 shows the assembly of the had saw. It is readily apparent that the hammer portion 13 as positioned in reverse can be used to drive a nail, while the V-shaped can be used to pull out a nail.

The preferred embodiments of the present invention have been described herein and shown in the accompanying drawings to illustrate the underlying principle of the invention, but is it to be understood that numerous modification may be made without departing from the spirit and scope of this invention.

What is claimed is:

1. A collapsible hand saw, comprising:
   a head portion, having a first opening (11) defined therethrough, a recess (12) formed on one side thereof;
   a handle portion (3), having a second opening (31) defined therethrough;
   a frame portion (2), being received in said first opening at one end and fixedly connected to said handle portion at the other end;
   a block (5), being registered with said recess to secure said frame portion via a screw (6);
   a blade (4), being detachably connected to said head portion and said handle portion at both ends in parallel to said frame member.

2. A collapsible hand saw as recited in claim 1, wherein, said head portion can be separated to receive a blade via said first portion thereby to work independently.

3. A collapsible hand saw as recited in claim 1, further comprising a hammer member (13) formed integrally on said head portion and a V-shaped notch (14) defined on the front of said head portion to pull out a nail.

4. A collapsible hand saw as recited in claim 1, wherein, a plurality of spare saws (7) can be placed and secured in cooperated with said frame member.

* * * * *